United States Patent [19]

Moore, Jr. et al.

[11] 4,328,791
[45] May 11, 1982

[54] GAS SUPPLEMENTED SOLAR COLLECTOR STORAGE MEANS

[75] Inventors: Henry J. Moore, Jr., Los Angeles; Lindy J. Bressickello, Baldwin Park, both of Calif.

[73] Assignee: Mor-Flo Industries, Inc., Santa Monica, Calif.

[21] Appl. No.: 159,180

[22] Filed: Jun. 13, 1980

[51] Int. Cl.³ .............................................. F24J 3/02
[52] U.S. Cl. ................................. 126/427; 122/17; 122/161
[58] Field of Search ............... 126/437, 436, 430, 400, 126/375, 427, 361; 122/17, 14, 161; 165/104 S, DIG. 4

[56] References Cited

U.S. PATENT DOCUMENTS

| | | | |
|---|---|---|---|
| 1,961,723 | 6/1934 | Wilson | 122/14 |
| 3,180,322 | 4/1965 | Gibbard | 122/17 |
| 4,207,866 | 6/1980 | Boyd | 126/437 |

FOREIGN PATENT DOCUMENTS 2002922  8/1971  Fed. Rep. of Germany ...... 126/361

Primary Examiner—Samuel Scott
Assistant Examiner—G. Anderson
Attorney, Agent, or Firm—Ralph B. Pastoriza

[57] ABSTRACT

The gas supplemented solar collector storage means includes a water tank having supply and return connections for circulating water from the tank to a solar collector and back to the tank. A combustion chamber having top and side openings is disposed within the upper half portion of the tank and connects respectively to an upwardly extending flue pipe and an inlet side cylinder to provide an air and gas passage through the upper half of the tank in heat exchange relationship with water. A gas burner is receivable in the combustion chamber and is operated by a thermostat to provide heat to the water only in the event that the solar heating of the water is insufficient to maintain the water above a minimum temperature.

6 Claims, 5 Drawing Figures

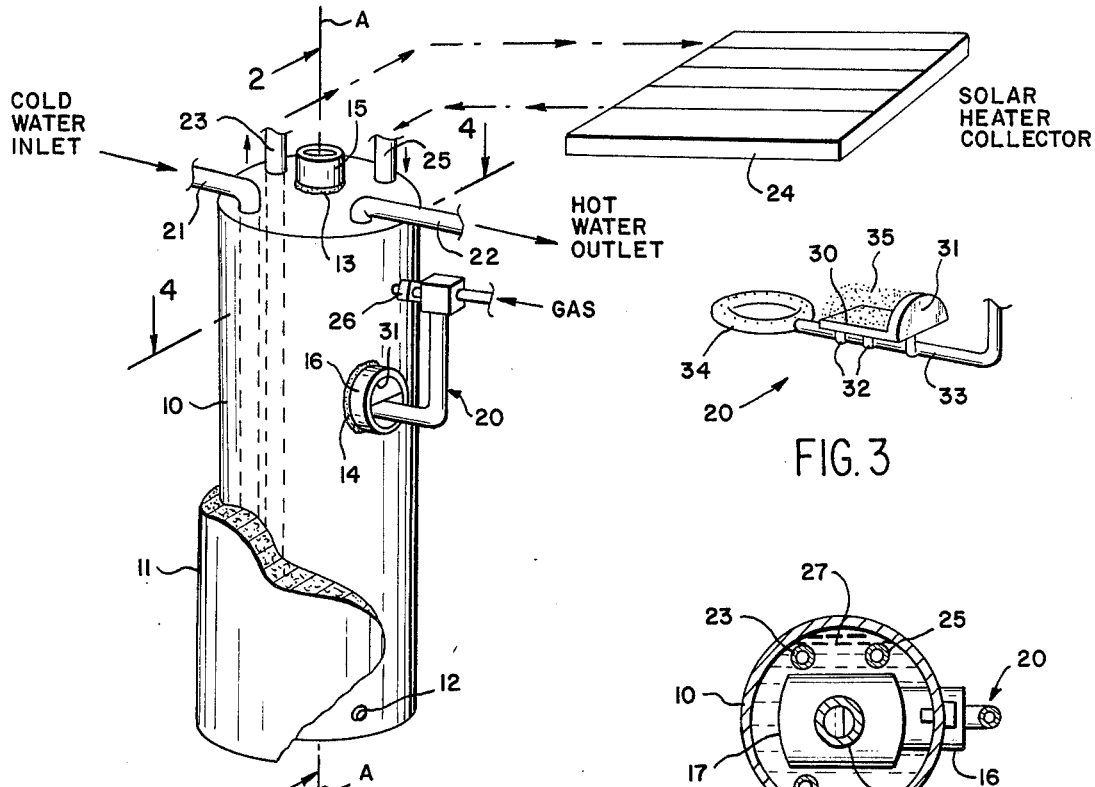
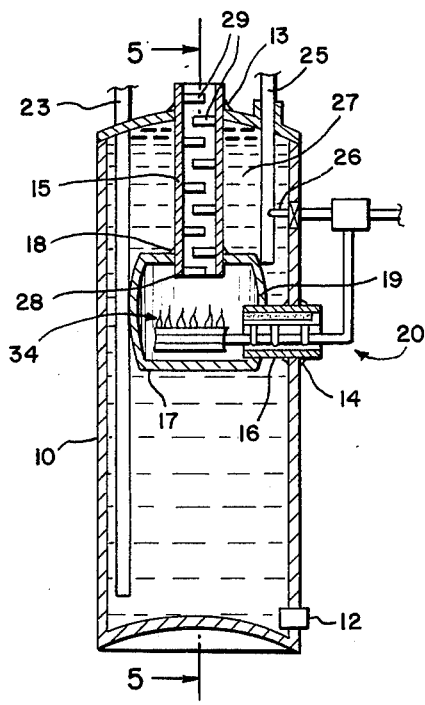
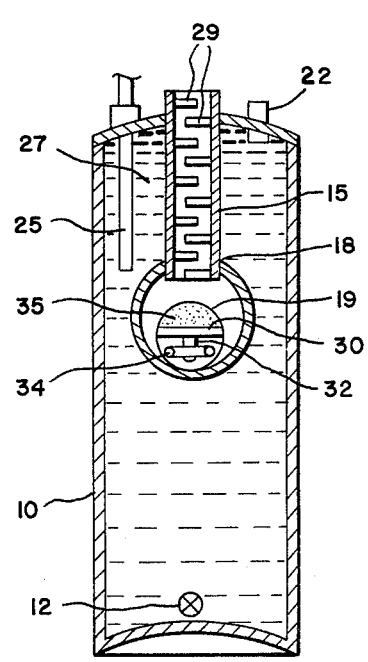

GAS SUPPLEMENTED SOLAR COLLECTOR STORAGE MEANS

This invention relates generally to gas supplemented solar collector storage means and more particularly to a water tank incorporating a gas heating means within the upper half of the tank for supplementing the heating of water in the tank by solar energy in the event the temperature of the water drops below a minimum amount.

BACKGROUND OF THE INVENTION

Many of the presently available solar heating systems include collector troughs for holding water in turn heated by solar radiation. The water is supplied from appropriate water tanks and after heating is returned to the water tanks, the tanks themselves serving as a storage for the heated water.

While such solar water heating systems have been successful, in the event there is a succession of cloudy days, the water in the storate tanks can become sufficiently cooled off that it is no longer effective as a heating medium or simply as use as hot water. It would be desirable if there were some type of supplemental heating arrangement so that the water could be maintained at a desired heated level even though solar energy might not be available. A desirable feature of any such supplemental heating means would be its rapid response to any drop in water temperature below a given set minimum amount.

BRIEF DESCRIPTION OF THE PRESENT INVENTION

With the foregoing in mind, the present invention contemplates the provision of a supplemented water collector storage means wherein a water tank is provided with supply and return connectors for circulating water from the tank to a solar collector and back to the tank. In addition, a gas heating means is disposed within the upper half of the tank for supplementing the heating of water in the tank by solar energy in the event the temperature of the water should drop below a minimum amount.

In the preferred embodiment of the invention, the gas heating means includes a combustion chamber supported in the upper half of the tank by an outlet flue pipe passing from the top of the combustion chamber out the top of the tank and an inlet cylinder passing from an opening in the side of the tank to the combustion chamber. The flue pipe and inlet cylinder serve as the sole support of the combustion chamber, the pipe, combustion chamber and inlet cylinder providing heat exchange surfaces with surrounding water in the upper half of the tank when a gas burner is turned on in the combustion chamber.

A simple thermostat control is provided for turning on the gas burner whenever the temperature in the upper half of the tank drops below a minimum amount.

With the foregoing arrangement, water in the storage tank will normally be heated by solar energy. The gas burner will only be operated in those instances where cloudy days result in a lack of sufficient solar radiation to maintain the water in the storage tank above a given minimum amount. As a consequence, hot water is always available and yet the major portion of the heating energy is provided by solar radiation.

BRIEF DESCRIPTION OF THE DRAWINGS

A better understanding of this invention will be had by now referring to a preferred embodiment thereof as illustrated in the accompanying drawings in which:

FIG. 1 is a perspective view partly cut away of a gas supplemented solar collector storage means in accord with the present invention;

FIG. 2 is a cross section taken in the direction of the arrows 2—2 of FIG. 1;

FIG. 3 is a fragmentary perspective view of a gas burner means utilized in the storage means of FIG. 1;

FIG. 4 is a cross section taken in the direction of the arrows 4—4 of FIG. 1; and, FIG. 5 is a cross section taken in the direction of the arrows 5—5 of FIG. 2.

DETAILED DESCRIPTION OF THE PREFERRED EMBODIMENT

Referring first to FIG. 1, the supplemented solar collector storage means includes a vertical cylindrical water tank 10 preferably surrounded by a heat insulation jacket 11 shown broken away to avoid obscuring other portions of the tank. The lower end of the tank may include a drain plug 12.

The cylindrical tank 10 itself is provided with a top opening 13 coaxial with the vertical cylindrical axis A—A of the tank and a side opening 14 in the upper half portion of the tank. A vertical open-ended cylindrical flue pipe 15 is provided in the upper half portion of the tank, the upper end of the pipe passing through and being secured to the periphery of the top opening 13, so as to be supported by the tank. Similarly, an horizontal inlet cylinder 16 has an outer end passing through and secured to the periphery of the side opening 14 so as to be supported in this position by the tank.

Referring momentarily to the cross section of FIG. 2, there is shown disposed within the upper half portion of the tank a combustion chamber 17 having a top opening 18 and a side opening 19 receiving respectively the lower end of the flue pipe 15 and the inner end of the inlet cylinder 16 in sealingly secured relationship. With this arrangement, a waterproof air passage is defined through the inlet cylinder into the combustion chamber and out of the flue pipe and the combustion chamber itself is supported relative to the tank wholly by the flue pipe and inlet cylinder.

Still referring to FIG. 2, it will be noted that the interior dimensions of the chamber 17 are greater than either of the diameters of the flue pipe 15 or inlet cylinder 16 whereby an acoustic impedance to air and gas flow through the inlet pipe, chamber and flue pipe results so that acoustic resonances are essentially avoided.

As shown in both FIGS. 1 and 2, there is provided a gas burner means designated generally by the arrow 20 receivable through the inlet cylinder 16 into the chamber 17.

Referring to FIG. 1, a cold water inlet is shown at 21 for passing water into the lower half of the tank 10 and a hot water outlet is shown at 22 for passing water out from the upper half of the tank.

Also shown in the upper portion of the tank of FIG. 1 is a solar collector water supply connector 23 for passing water from the bottom half of the tank to a solar collector schematically indicated at 24. A solar collector water return connector 25, in turn is provided for passing water from the solar collector 24 to the upper half of the tank 10.

The system is completed by the provision of a thermostat 26 in the upper half side wall of the tank 10 connected to turn on the gas burner means 20 whenever the temperature of water in the upper half of the tank falls below a given minimum temperature set in the thermostat. The same thermostat will function to turn the gas burner means 20 off whenever the temperature of the water rises above a given maximum temperature set in the thermostat.

With the foregoing arrangement, the gas burner means is available to automatically supplement heating of water in the tank in the event the heating by solar energy in the collector 24 alone is not sufficient to maintain the water at a temperature exceeding the minimum temperature.

Returning again to FIG. 2, the water in the upper half of the tank 10 is indicated at 27 and it will be noted that it is in heat exchange relationship with all hot gases in the combustion chamber 17 and flue pipe 15. In actual embodiments of the present invention, it is preferable that the combustion chamber be disposed within the upper third portion of the tank 10 although such is not essential. It should be understood as is evident from FIG. 2 that only a fraction of the total water in the tank need be heated by the supplemental gas burner means since the design is for a major heating by solar energy and the few times when supplemental heating is necessary are sufficiently rare that only the upper third portion of the water need really be subjected to the supplemental heat for purposes of maintaining a proper water temperature.

While the larger chamber dimensions relative to the diameters of the inlet cylinder and flue pipe provide for a discontinuity and thus an acoustic impedance to flow therethrough and thereby avoid resonances, it is found that even more improved avoidance of possible resonances as well as even distribution of heat for exchange purposes occurs when the lower end of the flue pipe 15 extends within the combustion chamber 17 a given distance. This given distance is indicated at 28 in FIG. 2 and might for example be of the order of two inches for a tank of inside diameter of 20 inches and overall height of approximately 60 inches.

Supplementing the foregoing further increase in acoustic impedance is the provision of gas flow baffling means indicated at 29 in the flue pipe 15. This baffling means provides for an increased back pressure over that which would exist in the absence of the baffling means to thereby increase the retention of heat in the chamber 17 and flue pipe when the gas burner means 20 is on.

Referring now to the small fragmentary perspective view of FIG. 3, certain details of the gas burner means 20 will be described. As shown, the structure includes a rectangular body 30 of width and length corresponding to the inside diameter and length of the inlet cylinder 16 respectively. The body 30 has an upturned outer end 31 of semi-circular shape as shown. This semi-circular shape is dimensioned to fit in the upper half of the outer end of the inlet cylinder 16 as is clear from FIG. 1.

Extending from the underside of the rectangular body 30 are supports 32 for holding a gas line 33 extending along the underside of the body. Gas line 33 terminates in a gas flame burner ring 34.

The assembly of FIG. 3 is completed by the provision of fiberglass 35 to fill the top portion of the body 30 and the area behind the upturned end 31. The entire body, supports and gas line are slidable as a unit into the inlet cylinder 16 to position the gas burner ring in a central part of the combustion chamber and secure the same against yawing movement. In this respect, since the width of the rectangular body 30 corresponds to the inside diameter of the inlet cylinder 16, it will engage the inside side walls of the cylinder and also serve as a support for the gas line and burner ring 34.

In the top cross section of FIG. 4 and other side cross section of FIG. 5, the dimensioning of the combustion chamber 17 nd its relationship with the inlet cylinder 16 receiving the gas burner assembly will be evident. With particular reference to FIG. 5, it will further be noted that the hot water outlet 22 removes water from the uppermost portion of the tank which is where the water of the highest temperature will tend to accumulate since the temperature gradient extends from the bottom up through the tank.

Because of the unique assembly construction for the gas burner means as described in FIG. 3, it can easily be inserted and removed from the combustion chamber for servicing.

It will be understood that in operation, the water in the tank 10 is normally heated above a set minimum value by the solar collector 24. Only in those instances where the sun might fail to shine for two or three days in a row is the supplemental gas heating utilized. Thus, the eventual cooling of the water below the minimum set temperature level is detected by the thermostat 26 and will turn on the gas burner means 20 to thereby heat the water in the upper half or third portion of the tank 10 by heat exchange. When the temperature of this water rises above a set maximum amount, the thermostat will turn the gas burner means off. Thereafter, the water should be retained at a desirable heated temperature by the solar collector alone provided that normal sunshine is available.

It will be appreciated that because the gas flame essentially is instantly generated when the thermostat turns on the gas, there is a very rapid response time to a change in the water temperature to heat the same. Moreover, by disposing the supplemental heating arrangement in the upper half portion of the tank, energy is conserved over that which would be required were a gas heater provided at the bottom of the tank as in conventional hot water heaters.

From all of the foregoing, it will thus be evident that the present invention has provided a greatly improved gas supplemented solar collector storage means. Various modifications falling clearly within the scope and spirit of this invention will occur to those skilled in the art. The invention accordingly is not to be thought of as limited to the specific embodiment disclosed for illustrative purposes.

We claim:

1. A gas supplemented solar collector storage means including, in combination:
   (a) a water tank having supply and return connections for circulating water from said tank to a solar collector and back to the tank;
   (b) a gas heating means disposed within the upper half of said tank for supplementing the heating of water in said tank by solar energy in the event the temperature of the water should drop below a minimum amount; and
   (c) a thermostat responsive to the temperature of water in the upper half of said tank for automatically turning the gas heating means on when said temperature drops below said minimum amount, said gas heating means including a combustion chamber in the upper half of said tank having side and top openings; a flue pipe passing from the top of the tank to connect to the top opening and an inlet cylinder passing from the side of the tank to connect to the side opening; and gas burner means in said chamber connected for operation by said thermostat to thereby generate heat and provide for a heat exchange with water surrounding said chamber, flue pipe and inlet cylinder, said flue pipe and inlet cylinder serving the additional function of constituting the sole support for said combustion chamber in said tank.

2. A gas supplemented solar collector storage means including, in combination:
 (a) a vertical cylindrical water tank having a top opening coaxial with its vertical cylindrical axis and a side opening in its upper half portion;
 (b) a vertical open-ended cylindrical flue pipe within said upper half portion of the tank, the upper end of said pipe passing through and being secured to the periphery of said top opening so as to be supported by said tank;
 (c) an horizontal inlet cylinder having an outer end passing through and secured to the periphery of said side opening so as to be supported by said tank;
 (d) a combustion chamber disposed within the upper half portion of said tank and having a top opening and a side opening receiving, respectively, the lower end of said flue pipe and the inner end of said inlet cylinder in sealingly secured relationship so that a waterproof air passage is defined through said inlet cylinder into the combustion chamber and out of the flue pipe and so that said combustion chamber is supported relative to the tank wholly by said flue pipe and inlet cylinder the interior dimensions of the chamber being greater than either of the diameters of said flue pipe and inlet cylinder to provide an acoustic impedance to air and gas flow and thereby avoid acoustic resonances;
 (e) a gas burner means receivable through said inlet cylinder into said chamber;
 (f) a cold water inlet for passing water into the lower half of the tank;
 (g) a hot water outlet for passing water out from the upper half of the tank;
 (h) a solar collector water supply connector for passing water from the bottom half of the tank to a solar collector;
 (i) a solar collector water return connector for passing water from said solar collector to the upper half of said tank; and
 (j) a thermostat in the upper half side wall of said tank connected to turn on said gas burner means whenever the temperature of water in the upper half of said tank falls below a given minimum temperature set in the thermostat and to turn off the gas burner means whenever the temperature of the water rises above a given maximum temperature set in the thermostat whereby the gas burner means is available to automatically supplement heating of water in the tank in the event the heating by solar energy alone is not sufficient to maintain the water at a temperature exceeding said minimum temperature.

3. The subject matter of claim 2, in which the lower end of said flue pipe extends into the interior of said chamber a given distance to increase the impedance of air and gas flow from the chamber to the exterior.

4. The subject matter of claim 2, including gas flow baffling means in said flue pipe to provide an increased back pressure over that which would exist in the absence of the baffling means to thereby increase the retention of heat in the chamber and flue pipe when said gas burner means is on.

5. The subject matter of claim 2, in which said gas burner means includes a rectangular body of width and length corresponding to the inside diameter and length of said inlet cylinders, said body having an upturned outer end of semicircular shape dimensioned to fit in the upper half of the outer end of said inlet cylinder; supports extending from the underside of said body, a gas line extending along the underside of said body secured to said supports and terminating in a gas flame burner ring, and fiberglass insulation material on the top side of said body, said entire body, supports and gas line being slidable as a unit into said inlet cylinder, the gas line and burner being held in a central consistent position against yawing movement by engagement and support of the long sides of said rectangular body with inner diametrically opposite surfaces of said inlet cylinder.

6. The subject matter of claim 2, including an insulation jacket surrounding said water tank, said tank having a bottom drain plug in a lower side portion.

* * * * *